(12) United States Patent
Onwulata

(10) Patent No.: US 6,610,347 B1
(45) Date of Patent: Aug. 26, 2003

(54) FIBER ENRICHED FOODS

(75) Inventor: Charles I. Onwulata, Cheltenham, PA (US)

(73) Assignee: The United States of America as represented by the Secretary of Agriculture, Washington, DC (US)

(*) Notice: Subject to any disclaimer, the term of this patent is extended or adjusted under 35 U.S.C. 154(b) by 212 days.

(21) Appl. No.: 09/741,467

(22) Filed: Dec. 20, 2000

(51) Int. Cl.$^7$ ............................................. A21D 13/00
(52) U.S. Cl. ........................ 426/549; 426/94; 426/496; 426/615; 426/656
(58) Field of Search ........................ 426/549, 94, 615, 426/496, 656

(56) References Cited

U.S. PATENT DOCUMENTS

| | | | |
|---|---|---|---|
| 4,143,163 A | | 3/1979 | Hutchison et al. |
| 4,315,954 A | | 2/1982 | Kuipers et al. |
| 4,565,702 A | | 1/1986 | Morley et al. |
| 4,673,578 A | | 6/1987 | Becker et al. |
| 4,927,654 A | | 5/1990 | Barnett et al. |
| 4,971,810 A | | 11/1990 | Hoyda et al. |
| 5,085,883 A | * | 2/1992 | Garleb et al. ............... 426/590 |
| 5,107,842 A | | 4/1992 | Levene et al. |
| 5,250,308 A | | 10/1993 | Alexander et al. |
| 5,270,063 A | | 12/1993 | Wullschleger et al. |
| 5,270,064 A | | 12/1993 | Shultz |
| 5,433,960 A | | 7/1995 | Meyers |
| 5,545,414 A | | 8/1996 | Behr et al. |
| 6,210,686 B1 | * | 4/2001 | Bell et al. ..................... 426/72 |

OTHER PUBLICATIONS

Strange, E.D., et al., "A Rapid Method for Laboratory Preparation of High Solids Casein and Caseinate Dispersions", *J. Dairy Sci.*, vol. 74, pp. 1181–1186, 1991.
Bourne, M., "Texture Profile Analysis", *Food Technology*, pp. 62–72, Jul. 1978.
Vratinina, D., et al., "Dietary Fiber Sources for Baked Products: Bran in Sugar–Snap Cookies", *J. Food Science*, vol. 42, (5), pp. 1590–1594, 1978.
Heller, S.N., et al., "Water–Holding Capacity of Various Sources of Plant Fiber", *J. Food Science*, pp. 1107–1108, 1977.
Cadden, A., "Comparative Effects of Particle Size Reduction on Physical Structure and Water Binding Properties of Several Plant Fibers", *J. Food Science*, vol. 52, (6), pp. 1598–1631, 1987.
Przybyla, A., "Formulating Fiber Into Foods", *Food Engineering*, pp. 77–88, 1988.
Inglett, G.E., "Development of a Dietary Fiber Gel for Calorie–Reduced Foods", *Cereal Foods World*, vol. 42, (5), pp. 382–385, May 1997.
Marlett, J., et al., "Position of the American Dietetic Association: Health Implications of Dietary Fiber", *J. American Dietetic Assoc.*, vol. 97, (10), pp. 1157–1159, Oct. 1997.
AACC, "Baking Quality of Cookie Flour", *American Association of Cereal Chemists*, pp. 1–6, Oct. 3, 1984.

Yokoyama, W., "Effect of Barley β–Glucan in Durum Wheat Pasta on Human Glycemic Response", *Cereal Chem.*, vol. 74, (3), pp. 293–296, 1997.
Ablett, S., et al., "The Significance of Water in the Baking Process", *Unilever Research Laboratories*, pp. 30–41 No date.
Guy, E.J., et al., "Effect of Cheese Whey Protein Concentrates on the Baking Quality and Rheological Characteristics of Sponge Doughs Made From Hard Red Spring Wheat Flour", *Cereal Science Today*, vol. 19, (12), pp. 551–556, Dec. 1974.
Sanchez, H.D., et al., "Whey Protein Concentrates in Baking 1. Effect on Rheological Properties", *Bakers Digest*, pp. 18–20, May 8, 1984.
Park, H., et al., "Fortifying Bread With a Mixture of Wheat Fiber and Psyllium Husk Fiber Plus Three Antioxidants", *Cereal Chem.*, vol. 74, (3), pp. 207–211, 1997.
Zhang, D., et al., "Effect of Wheat Bran Particle Size on Dough Rheological Properties", *J. Sci. Food Agric.*, vol. 74, pp. 490–496, 1997.
Ranhotra, G.S., et al., "High–fiber White Flour and Its Use in Cookie Products", *Cereal Chem.*, vol. 68, (4), pp. 432–434, 1991.
Golden, J., et al., "A Comparative Evaluation on High Fiber Muffins", *Ecology of Food and Nutr.*, vol. 33, pp. 195–202, 1994.
Slavin, J., "Dietary Fiber: Classification, Chemical Analyses, and food Sources", *J. American Dietetic Assoc.*, vol. 87, pp. 1164–1168, 1987.
Pick, M., et al., "Oat Bran Concentrate Bread Products Improve Long–Term Control of Diabetes: A Pilot Study", *J. American Dietetic Assoc.*, vol. 96, (12), pp. 1254–1261, 1996.
Hudson, C.A., et al., "Development and Characteristics of High–Fiber Muffins With Oat Bran, Rice Bran, or Barley Fiber Fractions", *Cereal Food World*, vol. 37, (5), pp. 373–376, May 1992.

* cited by examiner

*Primary Examiner*—Lien Tran
(74) *Attorney, Agent, or Firm*—John D. Fado; G. Byron Stover

(57) ABSTRACT

Disclosed is a dietary fiber composition produced by a process involving cooking a calcium caseinate or calcium caseinate and whey protein isolate slurry (containing no more than 50% whey protein isolate) in an evaporator to produce a slurry of cross-linked matrices of protein, adding dietary fiber to the slurry of cross-linked matrices of protein to form a mixture, and spray atomizing the mixture in a spray dryer to produce the dietary fiber composition. Also disclosed is a fiber enriched food product containing at least one food ingredient and the dietary fiber composition. Additionally, there is disclosed a method of making a fiber enriched food product involving mixing one or more food ingredients with the dietary fiber composition. Furthermore, there is disclosed a method of increasing fiber in the diet of a mammal involving feeding to the mammal the fiber enriched food product.

16 Claims, 3 Drawing Sheets

FIBER ENRICHED FOODS

BACKGROUND OF THE INVENTION

The present invention relates to a dietary fiber composition produced by a process involving cooking a calcium caseinate or calcium caseinate and whey protein isolate slurry (containing no more than 50% whey protein isolate) in an evaporator to produce a slurry of cross-linked matrices of protein, adding dietary fiber to the slurry of cross-linked matrices of protein to form a mixture, and spray atomizing the mixture in a spray dryer to produce the dietary fiber composition. The present invention also concerns a fiber enriched food product containing at least one food ingredient and the dietary fiber composition. Additionally, the present invention also relates to a method of making a fiber enriched food product involving mixing the dietary fiber composition with one or more food ingredients. Furthermore, the present invention concerns a method of increasing fiber in the diet of a mammal involving feeding to the mammal the fiber enriched food product.

As the reports of the health and nutraceutical benefits of consuming dietary fibers continue to grow, research is focused on increasing the amount, content and quality of fibers in human diet. Consumers as well as nutrition-focused professional organizations are demanding increased amounts of fiber in processed foods. The results of recent surveys of the amount of fiber consumed by Americans reveal that most consume less than 50% of the estimated desirable daily fiber intake. Current average fiber intake is estimated at about 12 g/day, but the American Dietetic Association recommends 20–35 g/day (J. Am. Dietetic Assoc., 93: 1446–1447 (1993)).

Foods rich in fiber help with the management of a host of conditions. Associated healthful benefits of increasing fiber consumption include reduced risk of some types of cancer (including breast cancer) and coronary heart disease, regulation of blood glucose and insulin, lowering the concentration of blood lipids, reduced risk of cardiovascular disease and controlling diabetes, alleviating constipation, hemorrhoids and diverticulitis (Wolk, A., et al., JAMA, 281(21): 1998–2004 (1999); Kritchevsky, D., Cereal Foods World, 42(2): 81–85 (1977)

It is desirable and beneficial to increase the amount of fiber in most prepared foods; however, there are considerable difficulties associated with increased levels of fiber in foods. Increasing the amount of fiber in prepared foods alters the textural properties (Vratanina, D. L., et al., J. Food Sci., 43(5): 1590–1594 (1978); Zhang, D., et al, J. Sci. Food Agric., 74:490–496 (1977); Cadden, A., J. Food Sci., 52(6): 1595–1599, 1631 (1987)). Dietary fibers tend to absorb and withhold water from their surrounding environment, hence the water holding capacity is increased. When dietary fiber is incorporated into foods, it absorbs water from the other components, making the surrounding food components dry and brittle. Incorporating large amounts of unmodified fiber into food products destroys the natural cohesion and moistness of the products. When unmodified fiber is incorporated into baked foods there is a tendency to reduced volume. Unmodified fiber also can not be used in various foods such as drinks, yogurt or in pizzas. Overall, increasing the level of unmodified fiber in food products destroys textural integrity (Zhang, D., et al, J. Sci. Food Agric., 74: 490–496 (1977)).

The current level of fiber fortification in breads and cookies is generally less than 3%. These levels could be greatly increased in food products if there was available fibers with reduced water-binding properties. The present study determined the effect of adding protein-coated fiber (e.g., bran fiber) into food products such as baked products (e.g., muffins and cookies). It was also determined whether modifying the property of fiber (e.g., bran) by coating it with proteins would reduce the water-binding properties of fiber and allow for incorporating such fiber into foods in large quantities in, for example, baked goods.

SUMMARY OF THE INVENTION

In accordance with the present invention, there is provided a dietary fiber composition produced by a process involving cooking a calcium caseinate or calcium caseinate and whey protein isolate slurry (containing no more than 50% whey protein isolate) in an evaporator to produce a slurry of cross-linked matrices of protein, adding dietary fiber to the slurry of cross-linked matrices of protein to form a mixture, and spray atomizing the mixture in a spray dryer to produce the dietary fiber composition.

Also provided is a fiber enriched food product containing at least one food ingredient and the dietary fiber composition.

Additionally, there is provided a method of making a fiber enriched food product involving adding the dietary fiber composition to one or more food ingredients.

Furthermore, there is provided a method of increasing fiber in the diet of a mammal involving feeding to the mammal the fiber enriched food product.

DETAILED DESCRIPTION OF THE INVENTION

Figure 1A:
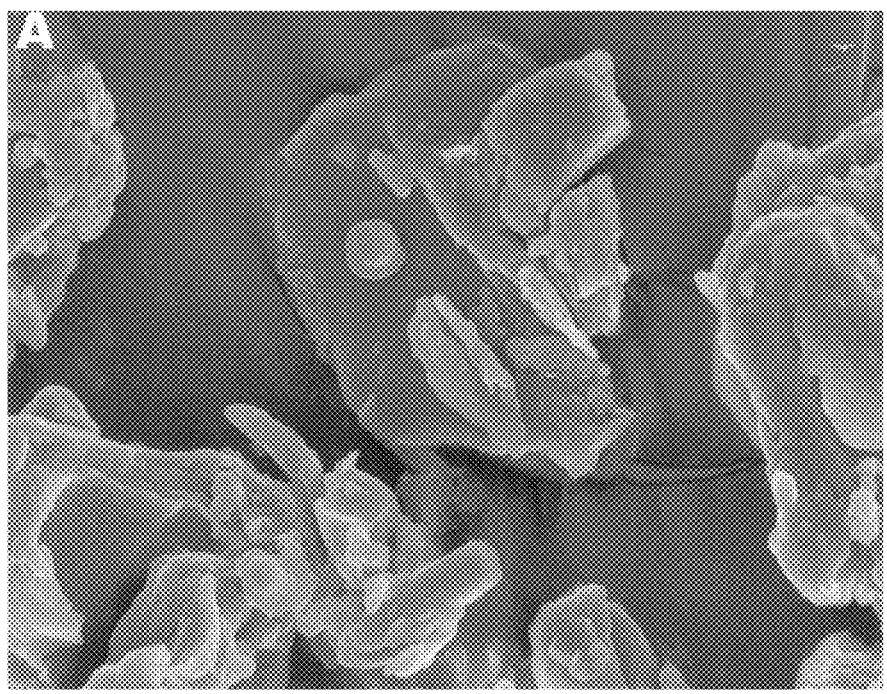
FIG. 1 shows scanning electron micrographs of wheat bran (A) and protein coated wheat bran (B)

The present invention relates to a dietary fiber composition produced by a process involving cooking a calcium caseinate or calcium caseinate and whey protein isolate slurry (containing no more than 50% whey protein isolate) in an evaporator to produce a slurry of cross-linked matrices of protein, adding dietary fiber to the slurry of cross-linked matrices of protein to form a mixture, and spray atomizing the mixture in a spray dryer to produce the dietary fiber composition. Generally, the slurry of calcium caseinate or the slurry of calcium caseinate and whey protein isolate (wherein the slurry contains no more than 50% whey protein isolate) is prepared by adding the caseinate or calcium caseinate and whey protein isolate to a food processor and running the food processor to distribute the ingredients evenly (generally about one second), then adding ice to the food processor and running for about 15 seconds (alternatively, the ice can be first run in the food processor for about one second and then the calcium caseinate or calcium caseinate and whey protein isolate can be added and run in the food processor for about 15 seconds), optionally hand mixing the ingredients and running in the food processor for about another 15 seconds, transferring the slurry to a container and adding water (the slurry will generally contain about 75%–85% water), and running in an evaporator for about 60-about 75 minutes at about 85° C.

(generally about 65° C. to about 85° C.) and about 140 (generally about 120 to about 160 rpm). Generally about 10% to about 15% of dietary fiber (including, but are not limited to, bran from cereal grains (e.g., wheat bran, oat bran, corn bran)) is added to the slurry and spray atomized in a spray dryer (generally about 17,000 to 20,000 rpm, generally about 210° C. to about 220° C.) to produce the dietary fiber composition.

The present invention also concerns a fiber enriched food product containing at least one food ingredient and the dietary fiber composition. The food ingredient may be any food ingredient. For example, the food ingredient may be the ingredients for cookies or muffins such as flour. Furthermore, the food ingredient may be shelf-stable packaged pre-mixes for preparing food and beverage compositions, usually requiring the addition of other ingredients (e.g., eggs, shortening, water or milk) to be supplied and added by the preparer. Additionally, the food ingredient may be a ready-to-cook mix (combined food ingredients that require additional cooking (e.g., baking, frying, micro waving) to form a ready-to-eat food or beverage product). Generally, the fiber enriched food product may be any food product such as a drink, yogurt, or pizza, or a bakery product such as cake, biscuit, pie crust, cookie, muffin, bread, cereal, doughnut, noodle, brownie, cracker or snack food. The amount of the dietary fiber composition contained in the fiber enriched food product may be any amount that does not adversely affect the food product (for example, the fiber enriched food product may contain about 1% to about 40% of the dietary fiber composition, preferably about 5% to about 30%, more preferably about 5% to about 20%, most preferably about 10% to about 15%). For example, the amount of the dietary fiber composition contained in the fiber enriched food product may be any amount which does not significantly lower the moisture content of the food product or significantly reduce the displaced volume of the food product in comparison to a food product that does not contain the dietary fiber composition. Generally, the dietary fiber composition is substituted weight-for-weight for flour.

Additionally, the present invention also relates to a method of making a fiber enriched food product involving adding the dietary fiber composition to one or more food ingredients (or vice versa). For example, in making cookies or muffins, the dietary food composition can partially substitute for flour or be added in addition to flour in the preparation of cookies or muffins. If cooking (e.g., baking, frying, micro waving) is required, then normal cooking conditions are utilized.

Furthermore, the present invention concerns a method of increasing fiber in the diet of a mammal involving feeding to the mammal the fiber enriched food product described herein. Generally, the mammal is a human.

The following examples are intended only to further illustrate the invention and are not intended to limit the scope of the invention as defined by the claims.

EXAMPLES

Materials: Coarse stabilized red wheat bran (product number 02-12-RC), medium stabilized oat bran (product number 0-10-RM), and medium stabilized corn bran (product number 07-12-LM) were purchased from Canadian Harvest Process, Ltd. (Ontario, Canada). Calcium caseinate (Alanate 391) and whey protein isolate (Alacen 895) were purchased from New Zealand Milk Products, Inc. (Santa Rosa, Calif.). The proximate compositions of the materials are as follows: Wheat bran, moisture 5.6%; protein, 17.2%; total dietary fiber, 53.9% (insoluble fiber, 51.0% and soluble fiber, 2.9%). Oat bran, moisture 3.64%; protein, 2.54%; total dietary fiber, 85% (insoluble fiber, 84.28% and soluble fiber, 0.72%). Corn bran, moisture 2.79%; protein, 4.29%; total dietary fiber, 87.71% (insoluble fiber, 84.56% and soluble fiber, 2.15%). Calcium caseinate, protein, 92.0%; moisture 4.0%; ash, 3.4%; fat, 1.2%; and lactose, 0.3%. Whey protein isolate, protein, 94.0%; moisture 3.9%; ash, 1.6%; fat, 0.5%; and lactose, 0.5%.

Methods

Protein-coated bran: The bran was sieved and particles that passed through a sieve (149 micron sieve for red wheat bran and corn bran, 106 micron sieve for oat bran) were used for coating and for baking studies. The calcium caseinate or calcium caseinate/whey protein isolate (e.g., 50/50 w/w) slurries were prepared through a caseinate dispersion method (Strange, E. D., et al., J. Dairy Sci., 74: 1181–1186 (1991)). The calcium caseinate/whey protein isolate slurries may contain 50% or less whey protein isolate.

To prepare the calcium caseinate slurry, 20 g of calcium caseinate powder was measured and run in a food processor for one second to distribute the powder evenly, then 80 grams of ice was added to the powder and run in the food processor for 15 seconds (alternatively, the ice can be first run in the food processor for one second and then the calcium caseinate powder can be added and run in the food processor for 15 second). The casein and ice slurry was hand mixed and run in the food processor for another 15 seconds. The slurry was transferred to a 1000 ml flask and 200 ml of distilled water was added. The casein, ice, and water solution ran in an evaporator for 75 minutes at 85° C. and 140 rpm. After evaporation, the solution was transferred to a bottle. The procedure was repeated until 1000 ml of a slurry for each fiber was obtained.

A 50/50 calcium caseinate/whey protein isolate slurry was prepared using 10 g of calcium caseinate and 10 g of whey protein isolate, rather than 20 g of calcium caseinate. The same procedure used to prepare the calcium caseinate slurry was used to prepare the 50/50 calcium caseinate/whey protein isolate solution; however, the 50/50 calcium caseinate/whey protein isolate solution ran for 60 min in the evaporator rather than 75 minutes. This procedure was repeated until 1000 ml of solution for each fiber was obtained.

Moisture was determined for the solutions using a Sartorius Moisture Analyzer MA51 (Edgewood, N.Y.). Water holding capacity tests were completed on the fibers, before and after being coated. Two grams of both brans were placed in centrifuge tubes. Twenty milliliters of distilled water was added to the tubes and stirred with the fibers. After left standing for 20 minutes, the tubes were centrifuged (EconoSpin, Sorvall Instruments, DuPont) for five minutes at 25° C. Afterwards, the excess water was disposed and the tubes stood inverted for five minutes more. The tubes were weighed and their water holding capacities were calculated as follows: [(weight gain of fiber/dry weight)* 100]. Viscosity tests were also done on the solutions using a Brookfield Digital Rheometer Model DV-III (Stoughton, Mass.).

Baking Studies

Formulations: Sugar-snap cookies ("Approved Methods of the American Association of Cereal Chemists," Vol. I, AACC Method 10-50D, 1983, Revised Oct. 3, 1984, American Association of Cereal Chemists, St. Paul, Minn.) and muffins (Rombauer, I. S. and Becker, M. R.,"Joy of Cooking," p. 630 (1975), The Bobbs-McNill Co., Inc., Indianapolis, N.Y.) were selected as vehicles for the baking trials. Wheat bran or protein-coated wheat bran (i.e., the dietary fiber composition according to the present invention) were substituted weight-for-weight for flour in the modified formulations listed in Table 1. Formulations are presented on a flour basis. Crisco™ served as the vegetable shortening for all control formulations. Fluid whole milk (3.2% milkfat), fresh eggs, double acting baking powder (Rumford™), baking soda (Arm & Hammer), salt, and vanilla were purchased at a local supermarket. Dextrose solution (5.6%) was prepared from dextrose powder and water. A 4-qt mixing bowl (Kitchen Aid Model K5SS, Hobart, Troy, Ohio) was used for all dough preparation. Metal or plastic gauge strips were prepared to fit a polyethylene cutting board or metal cookie sheet to control thickness of the rolled dough. When wheat bran was substituted for flour in the formulations, the weight of added flour was adjusted for the lower moisture in the coated product and water was added to the formulation to make up the difference. All baking was done in a Despatch Rotary Oven Model 150 (Despatch Industries, Inc., Minneapolis, Minn.) equipped with a single revolving shelf.

Cookies: Sugar, salt, baking soda and shortening were creamed 3 min on the low setting of the mixer. Dextrose solution was added and the mixture was blended for 1 min. Flour mixed with wheat bran or protein-coated wheat bran was added and the dough was blended until it formed a ball (about 30 sec). Cookie dough was then turned out onto a greased cookie sheet and rolled to a thickness of 0.70 cm, using gauge strips. Circles of 7.0-cm diameter were cut out and the excess dough lifted away from the cookies which were then baked at 230° C. for 15 min. Baked cookies were cooled to ambient temperature on wire racks, measured to calculate average diameter and height, packed and stored. Eight cookies were obtained per batch; three replicates were prepared. (For one batch, multiply each ingredient listed in Table 1 by the factor 2.25).

Muffins: Dry ingredients (as listed in Table 1) were blended for 1 min, liquid ingredients were added, blended for 15 sec, scraped down with a spatula and blended for another 15 sec. 68-g aliquots were scaled into 9 holes, each 6.4 cm in diameter, of a 12-hole muffin tin, previously sprayed with a flour-oil mixture. 60 mL water were measured into each empty hole. Muffins were baked at 230° C. for 24 min. Muffins were cooled briefly in the pans, then turned out on wire racks and cooled to ambient temperature. They were then packed in a single layer in freezer bags and stored frozen until used. Nine muffins were obtained per batch; three batches were prepared for analysis. (For one batch, multiply each ingredient listed in Table 1 by the factor 2.42).

Physical Measurements

Moisture content was measured as per Method #925.09, AOAC, 1998, using a vacuum oven.

Protein content of samples was determined using the LECO® Corporation FP-2000 nitrogen analyzer. Protein conversion factor of 5.70 was used.

Color measurements of the products were evaluated instrumentally with a Gardner infrared spectrophotometer Model TCM (BYK-Gardner, Inc., Silver Spring, Md.) equipped with illuminant A. Calibration values were as follows: L, 98.34; a, −0.21; b, 0.19. Hunter L, a, and b values were obtained directly from quadruplicate measurements. The samples were rotated 90° after each measurement.

Mechanical Testing: Instrumental texture profile analysis was performed on all samples at 25° C. with an Instron Universal Testing Machine Model 4201, (Instron, Inc., Canton, Mass.) equipped with either a 50 N or a 500 N compression load cell. All samples were compressed at a crosshead speed of 10 cm/min. The Instron Cyclic Foam Compression Test Software™ was used for data acquisition and control during the tests. Force-time curves were analyzed for hardness, springiness and cohesiveness as described by Bourne (Bourne, M. C., Food Technol., 32(7): 62–66, 72 (1978)). In preparation for testing, muffins were returned to their tins while frozen and the tops sliced off evenly; plugs (30 mm high×48 mm in diameter) were cut from the centers of the muffins while still frozen with a metal cylinder. Samples were wrapped tightly in plastic wrap and equilibrated to room temperature for 2 hr before texture analysis, where the cores were compressed to 40% of their original height. Whole cookies were analyzed; they were compressed only 20% of their height. Thickness and diameter were measured with Vernier calipers (4 measurements, rotating 90°/per sample). Four replicates of each product were prepared.

Volume measurements: Volume displacement was taken as the primary indicator of baking performance for the products made. The volumes, measured by glass bead displacement in a 500 mL plastic container, were taken 24 hr after baking. The specific volume of the glass beads used was 0.654 cm$^3$/g. Displaced volume was determined for eight samples of each of the three replicates of each product (24 measurements of each product).

Freshly thawed samples of wheat bran cookies and muffins (about 1–2 mL each) were cut and dialyzed against 10 mL of 5% glutaraldehyde in 0.1 M imidazole HCl buffer (pH 7.0) overnight at root temperature. Samples of WPC (whey protein concentrate) were removed from tubing (small sample held aside in glut. for embedding/thin sectioning) and washed in imidazole buffer. Samples were dehydrated overnight in 50% ethanol and absolute ethanol. After 24 hrs the samples were immersed in liquid nitrogen. Product fragments in nitrogen were removed and quickly thawed into ethanol and stored overnight; the next day they were critical point dried from carbon dioxide. Specimens were mounted on Al stubs with colloidal silver adhesive and sputter coated with a thin layer of gold and examined in scanning electron microscope (Model JSM840A, JEOL USA, Peabody, Mass.) operated in the secondary electron imaging mode at an instrumental magnification of 10,000×. Digital images were made with an Model IMIX1 workstation (Princeton Gamma-Tech, Princeton, N.J.).

Results

Figure 1B:
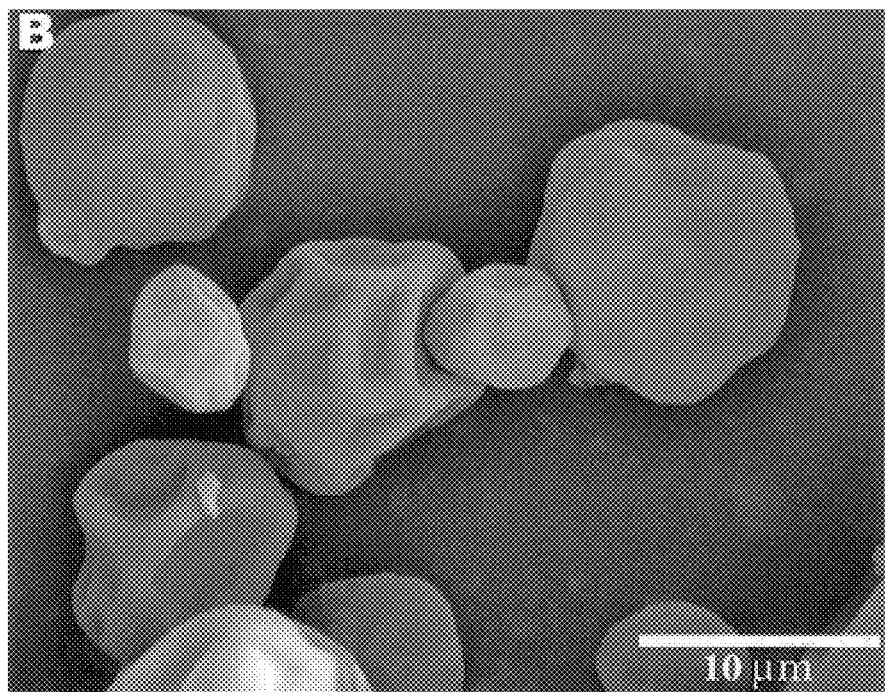

Moisture, particle size and water holding capacity of wheat bran and protein-coated wheat bran are presented in Table 2. Surprisingly, the most significant difference in the physical properties is in the water holding capacity which was dramatically reduced by applying a protein coating. Other significant differences were the reduction in particle size and changes in shape of the fiber particles (FIG. 1).

Cookies: The properties of the cookies made with non-coated and coated wheat bran is presented in Table 3. Products with wheat bran tended to be higher in moisture than the control (that is, cookies without wheat bran). In general, cookies with wheat bran were higher in moisture, but the products with protein-coated wheat bran was lower in moisture at the 5% level than the non-protein coated cookie containing the same amount of wheat bran. At the higher wheat bran content, surprisingly the protein-coated wheat bran products had higher moisture content.

Cookies made with coated wheat bran showed a 14 to 45% increase in protein. This reflects the level of added protein resulting from the coating process. The wheat bran products had the similar protein content as the control.

The total color difference of the cookies baked with wheat bran were slightly darker than the control. Higher values of the total color difference, ΔE, indicate lighter color. Generally, the protein-coated wheat bran cookies were darker than either control or the non-protein coated wheat bran.

Cookies with wheat bran were harder than the control, except for an anomaly, 5% wheat bran, which was softer than the control. Naturally, the inclusion of any kind of fiber affects textural properties, but particularly, inclusion of wheat bran increased hardness of cookies.

Figure 2:
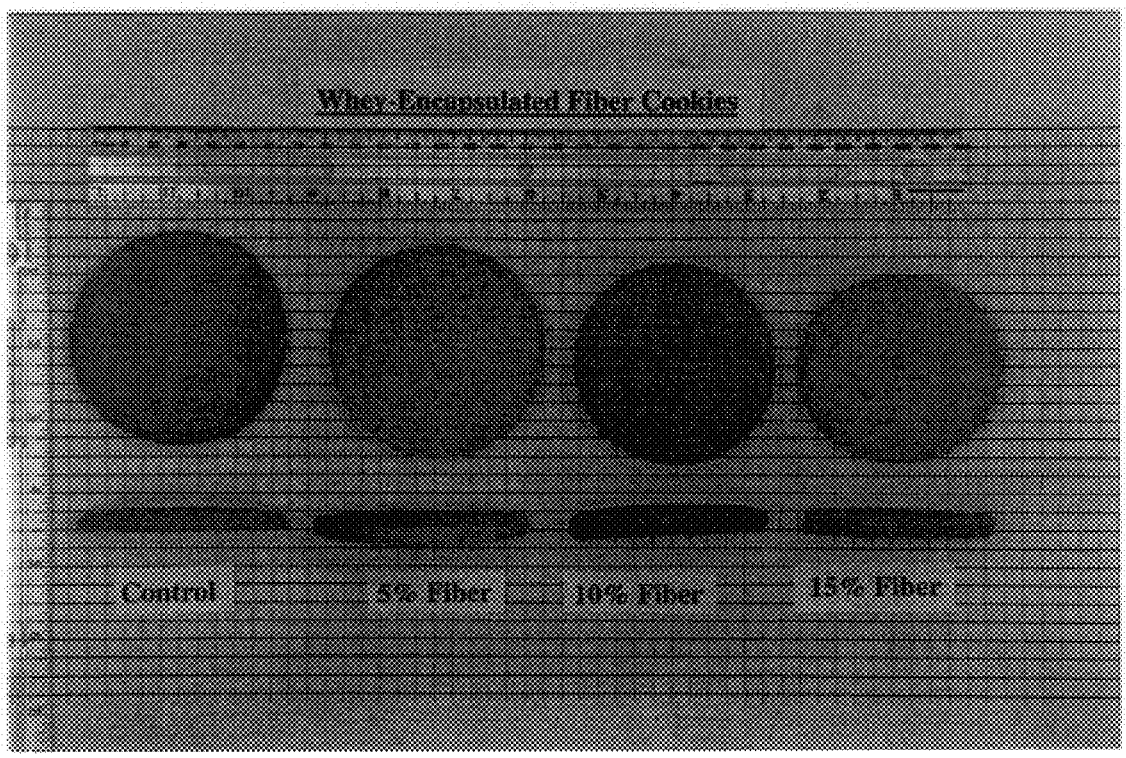
FIG. 2 shows photographic image of cookies baked with protein coated wheat bran.

Baked product volume is an important indicator of product acceptance. As the content of wheat bran increased, the volume of the baked product decreased (FIG. 2). At 5, 10, and 15% added bran, decreases of 5, 14, and 49% in the volume respectively were observed. Surprisingly, protein-coated wheat bran cookies showed increase in volume over both the control and the non-coated wheat bran, being 12% higher in volume than the control, 17% higher in volume than the non-protein coated wheat bran. But, as with the non-coated wheat bran, displaced volumes for the protein coated wheat bran cookies decreased as the amount added increased. Comparing product volume at 15% wheat bran level, protein-coated bran cookies were 60% higher in volume than the non-coated bran (FIG. 2).

Muffins: Physical properties of muffins containing various levels of wheat bran or protein-coated wheat bran is presented in Table 4. The moisture content of muffins containing the coated and non-coated wheat bran were higher than the control, but the moisture content of muffins made with the protein-coated wheat bran were lower than the non-coated wheat bran muffins. Because muffin is a high moisture product, there was only a small increase in moisture uptake with wheat bran, but the reduction in moisture uptake with the protein-coated wheat bran is surprisingly significant ($P<0.05$).

The protein content of the wheat bran muffins was only slightly higher than the control muffins. Muffins containing the protein-coated wheat bran were similarly higher in protein content as the cookies, again reflecting the added protein from the coating process.

Total color difference varied with the muffins at various levels of addition of wheat bran. At 5 and 10% respectively, the wheat bran products were darker than the control, but at 15% the product was lighter in color. At both the 5 and 15% level, the protein-coated wheat bran were surprisingly lighter in color than the control or the wheat bran; there was an anomalous result at the 10% level where the protein-coated fiber was darker than the control muffin products.

In general, wheat bran products of both kinds were harder than the control, except for the 5% level of both products, which were slightly softer, but not significantly softer than the control. A trend of increasing hardness with increasing amount of wheat bran was observed.

Figure 3:
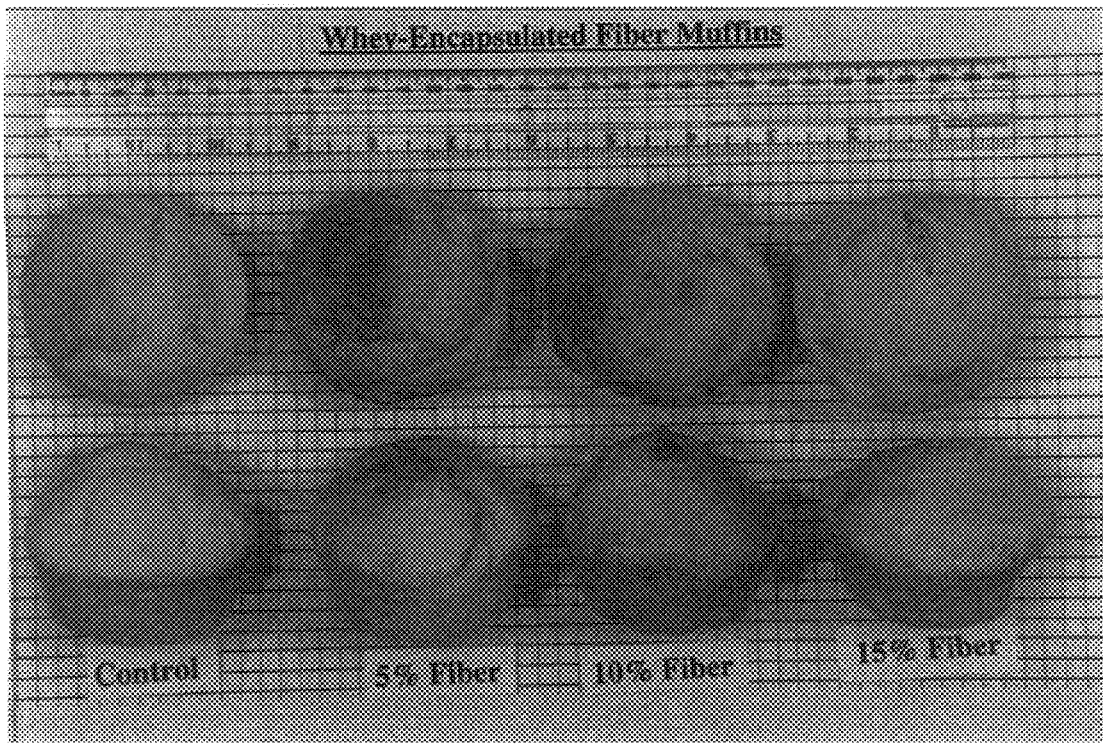
FIG. 3 shows photographic image of muffins baked with protein coated wheat bran.

Wheat bran muffin products were generally larger in volume than the control. Unlike cookies, muffins are high moisture products, and both kinds of wheat bran absorbed more moisture and increased in volume (FIG. 3). The increase in volume may be a result of swollen wheat bran fibers.

Tables 5 and 6—The results shown in Table 5 clearly show that the water holding capacity of coated fibers (50/50 Ca caseinate/whey protein isolate) is much lower than that for natural fibers.

TABLE 1

Formulations for cookies and muffins[1.]

| Ingredients | Control | % Wheat Bran | | |
|---|---|---|---|---|
| | | 5 | 10 | 15 |
| Cookies[a] | | | | |
| All purpose flour | 100 | 95 | 90 | 85 |
| Sucrose | 57.8 | — | — | — |
| Vegetable Shortening | 28.4 | — | — | — |
| Dextrose Solution | 14.7 | — | — | — |
| Water | 13.3 | — | — | — |
| Vanilla Extract | 2.7 | — | — | — |
| Baking Soda | 1.1 | — | — | — |
| Salt | 0.9 | — | — | — |
| Wheat Bran | — | 5 | 10 | 15 |
| Muffins[b] | | | | |
| All purpose flour | 100 | 95 | 90 | 85 |
| Fluid Whole Milk | 75.6 | — | — | — |
| Whole Egg | 26.0 | — | — | — |
| Sucrose | 21.1 | — | — | — |
| Vegetable shortening | 21.1 | — | — | — |
| Water | 8.3 | — | — | — |
| Baking Powder | 4.3 | — | — | — |
| Salt | 2.1 | — | — | — |
| Wheat Bran | — | 5 | 10 | 15 |

[1]Three batches of each formulation were prepared. All formulations are on flour basis; to formulate a full batch, multiply recipe with conversion factors 2.42 and 2.25, for cookies and muffins, respectively. [a]Baking was done at 230° C. for 15 min. [b]Baking was done at 230° C. for 24 min. All formulations contained baking soda, salt, dextrose solution and vanilla at levels of 1.1%, 0.9%, 14.7% and 2.7%, respectively, flour basis. Vegetable shortening was melted before blending into the dough.

TABLE 2

Physical properties of wheat bran and protein coated wheat bran.

| PRODUCT | Moisture (%) | Mean Particle Size (μm) | Water Holding Capacity (%) |
|---|---|---|---|
| Wheat bran | 2.3 | 13.7 | 226 |
| | (0.5) | (1.2) | (2.0) |
| Protein Coated Bran | 6.5 | 7.6 | 64 |
| | (0.5) | (1.2) | (1.5) |

TABLE 3

Properties of Cookies with Various Levels of Wheat Bran

| | Moisture % | Protein % | Color ΔE | Hardness N | Displaced Volume cm³ |
|---|---|---|---|---|---|
| Control | 6.1 | 6.4 | 50.5 | 18.5 | 21.7 |
| 5 | 8.8 | 6.5 | 48.8 | 11.2 | 20.6 |
| 10 | 5.9 | 6.4 | 49.7 | 32.5 | 18.7 |
| 15 | 7.6 | 6.8 | 49.7 | 33.7 | 11.1 |
| Protein Coated Fiber | | | | | |
| 5 | 7.5 | 7.3 | 46.0 | 25.8 | 24.2 |
| 10 | 7.3 | 8.7 | 47.8 | 37.4 | 23.3 |
| 15 | 10.1 | 9.3 | 48.0 | 33.2 | 17.8 |
| PSD | 1.0 | 0.3 | 1.2 | 1.6 | 1.7 |

PSD = pooled standard deviation

TABLE 4

Properties of Muffins with Various Levels of Wheat Bran

| | Moisture % | Protein % | Color ΔE | Hardness N | Displaced Volume cm³ |
|---|---|---|---|---|---|
| Control | 36.4 | 6.9 | 46.7 | 1.6 | 73.9 |
| 5 | 40.2 | 7.4 | 35.8 | 1.4 | 89.5 |
| 10 | 40.7 | 7.1 | 45.2 | 1.8 | 77.0 |
| 15 | 40.1 | 7.5 | 49.7 | 2.0 | 80.8 |
| Protein Coated Fiber | | | | | |
| 5 | 38.7 | 8.2 | 50.2 | 1.4 | 85.4 |
| 10 | 36.6 | 8.5 | 31.8 | 1.9 | 85.4 |
| 15 | 38.1 | 9.5 | 70.9 | 2.0 | 79.5 |
| PSD | 1.4 | 0.4 | 1.4 | 0.5 | 2.2 |

PSD = pooled standard deviation

TABLE 5

Water holding capacity of natural fibers and protein coated fibers (%)

| Product | Natural Fiber | Protein Coated Fiber |
|---|---|---|
| wheat bran | 226 | 63 |
| corn bran | 264 | 82 |
| oat bran | 299 | 85 |

TABLE 6

Mean particle size analysis (μm) of natural fibers and protein coated fibers.

| Product | Natural Fiber | Protein Coated Fiber |
|---|---|---|
| wheat bran | 13.7 | 7.6 |
| corn bran | 7.1 | 5.9 |
| oat bran | 6.9 | 5.5 |

Discussion: The absorption of water in baked goods containing fiber of any source affects the physical characteristics of the dough and during baking. Water affects baked products and is important because of gelatinization of starch during heating. Starch gelatinization during baking occurs over a narrow water activity range (Ablett, S., et al., The significance of water in the baking process, IN "Chemistry and Physics of Baking," ed. J. M. V. Blanshard, P. J. Frazier and T. Galliard, pp. 30–41 (1985), The Royal Society of Chemistry, London). The addition of wheat bran into bread dough systems increases water absorption (Zhang, D., et al, J. Sci. Food Agric., 74: 490–496 (1997)), the particle size of the wheat bran being an important factor. The effect of added wheat bran on baking performance was reported to be detrimental to loaf volume (Cadden, A., J. Food Sci., 52(6): 1595–1599, 1631 (1987)). The present results show a reduction in particle size with the protein coated wheat bran and, as a result, reduced water absorption. The non-coated wheat bran, though composed of relatively fine particles (<149 microns), absorbed much more water than the protein coated fiber. Without being bound by theory, it is speculated that protein coating of wheat bran creates a barrier and reduces the amount of water absorbed by the bran.

The protein coated wheat bran products were higher in protein content than the non-coated products. Increased whey protein content in baked products greater than 2% usually leads to loss in baking quality, especially when proteins are from whey concentrates (Guy, E. J., et al., Cereal Sci. Today, 19(12): 551–556 (1974)). In the present study, the whey protein was surprisingly denatured in the process of coating the wheat bran and this resulted in improved product characteristics.

It has been reported that the color of baked products containing wheat bran is negatively affected as the amount of bran added increases. Zhang et al. (1997) reported a darkening of the color of dough when wheat bran was added. Discoloration of baked sugar snap cookies by the presence of wheat bran has been reported (Vratanina, D. L., et al., J. Food Sci., 43(5):1590–1594 (1978)). In the present study, darkening was observed in cookies and muffins, except in muffins containing 5 and 15% protein coated wheat bran which were much lighter in color. It is thus possible to alleviate the discoloration of baked products containing wheat bran by coating the bran with whey proteins.

Shear strength of baked goods is an indicator of its textural quality. Vratinina et al. (1978) reported an increase in crispness in high fiber cookies associated with increasing shear strength; decreasing force (break strength) indicating a less crisp product. In the present study, cookies baked with protein-coated wheat bran were much harder and much more crisp in comparison to the control and cookies made with non-protein coated wheat bran.

Dietary fiber included in expanded products are known to decrease the volume. Zhang et al. (1997) reported that wheat bran included in bread reduced the volume. However, Dexter et al. (Dexter, J. E., et al, J. Cereal Sci., 20(2): 139–151 (1974)) reported an increase in volume in baked goods using fine wheat bran fractions. In the present study, both results were observed in the products. In cookies, adding fiber increased product volume. The volume of muffin products decreased for the non-coated wheat bran products, but increased at 5 and 10% levels in the protein coated wheat bran (the exception being the anomaly at 15% where volume decreased dramatically).

Without being bound by theory, it may be that the effect of increase or decrease in volume with wheat bran incorporated product is related to moisture absorption by the wheat bran. In very dry products such as cookies, volume increases because the fiber acts as spacers that increase volume. But in high moisture products, the fiber acts as a sponge to sorb the surrounding water, thereby reducing the volume of the product. By coating the wheat with protein, the volume is increased in high moisture product such as muffins.

Acceptance of baked products containing wheat bran fractions is high; products containing up to 30% wheat bran was rated as acceptable by a trained sensory panel (Golden et al., Ecology Food Nutr., 33:195–202 (1995)). Cookies baked with 20% wheat bran were rated high by a consumer panel (Vratinina et al., 1978). A consumer panel has reported the sensory properties of cookies containing wheat bran as acceptable, with a smoother crust and a less gritty mouth feel (Zhang et al., 1997). It is expected that the products produced according to the present study will be acceptable to a sensory panel.

Thus, through the process of coating wheat bran with whey protein, the functionality was improved, and the negative effect of reducing product volume was eliminated. Also, the textural properties such as hardness of baked cookies and muffins with added protein coated wheat bran was improved, making for a crispier product. By eliminating the deleterious effect of incorporating fiber in foods, more fiber can be provided to the consumers of baked goods.

All of the references cited herein are incorporated by reference in their entirety. The following U.S. Patents are incorporated by reference in their entirety: U.S. Pat. Nos. 6,013,294; 5,587,196.

Thus, in view of the above, the present invention concerns (in part) the following:

A dietary fiber composition produced by a process involving cooking a calcium caseinate or calcium caseinate and whey protein isolate slurry, wherein the slurry contains no more than 50% whey protein isolate, in an evaporator to produce a slurry of cross-linked matrices of protein, adding dietary fiber to the slurry of cross-linked matrices of protein to form a mixture, and spray atomizing the mixture in a spray dryer to produce said dietary fiber composition.

The above dietary fiber composition, wherein the dietary fiber is selected from the group consisting of wheat bran, oat bran, corn bran, and mixtures thereof.

The above dietary fiber composition, the process further involving preparing a slurry of calcium caseinate or calcium caseinate and whey protein isolate, wherein the slurry contains no more than 50% whey protein isolate.

The above dietary fiber composition, wherein preparing the slurry of calcium caseinate or calcium caseinate and whey protein isolate involves processing ice and calcium caseinate or calcium caseinate and whey protein isolate.

The above dietary fiber composition, wherein preparing and cooking the slurry of calcium caseinate or calcium caseinate and whey protein isolate involves (a)(i) adding caseinate or calcium caseinate and whey protein isolate to a food processor and running the food processor to distribute the ingredients evenly, and adding ice to the food processor and running for about 15 seconds, or (ii) adding ice to the food processor and running for about one second, and adding caseinate or calcium caseinate and whey protein isolate to the food processor and running the food processor to distribute the ingredients evenly, (b) optionally hand mixing the slurry and running in the food processor for about another 15 seconds, (c) transferring the slurry to a container and adding water to where the slurry contains about 75% to about 85% water, and (d) running the slurry in an evaporator for about 60 minutes to about 75 minutes at a temperature of about 65° C. to about 85° C. and about 120 rpm to about 140 rpm.

The above dietary fiber composition, wherein the mixture contains about 10% to about 15% dietary fiber.

The above dietary fiber composition, wherein the spray atomizing is at about 17,000 rpm to about 20,000 rpm and at about 210° C. to about 220° C.

A fiber enriched food product containing at least one food ingredient and the above dietary fiber composition.

The above fiber enriched food product, wherein the fiber enriched food product contains about 1% to about 40% of the dietary fiber composition.

The above fiber enriched food product, wherein the food ingredient is flour.

The above fiber enriched food product which is a bakery product, wherein the bakery product is cake, biscuit, pie crust, cookie, muffin, bread, cereal, doughnut, noodle, brownie, cracker or snack food.

The above fiber enriched food product, wherein the bakery product is a cookie or muffin.

A method of making a fiber enriched food product, involving adding the above dietary fiber composition to one or more food ingredients or adding one or more food ingredients to the dietary fiber composition.

A method of increasing fiber in the diet of a mammal, involving feeding to said mammal the above fiber enriched food product.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A dietary fiber composition produced by a process comprising cooking a calcium caseinate or calcium caseinate and whey protein isolate slurry, wherein said slurry contains no more than 50% whey protein isolate, in an evaporator to produce a slurry of cross-linked matrices of protein, adding dietary fiber to said slurry of cross-linked matrices of protein to form a mixture, and spray atomizing said mixture in a spray dryer to produce said dietary fiber composition.

2. The dietary fiber composition according to claim 1, wherein said dietary fiber is selected from the group consisting of wheat bran, oat bran, corn bran, and mixtures thereof.

3. The dietary fiber composition according to claim 1, said process further comprising preparing a slurry of calcium caseinate or calcium caseinate and whey protein isolate, wherein said slurry contains no more than 50% whey protein isolate.

4. The dietary fiber composition according to claim 3, wherein preparing said slurry of calcium caseinate or calcium caseinate and whey protein isolate comprises processing ice and said calcium caseinate or calcium caseinate and whey protein isolate.

5. The dietary fiber composition according to claim 3, wherein preparing and cooking said slurry of calcium caseinate or calcium caseinate and whey protein isolate comprises (a)(i) adding said caseinate or calcium caseinate and whey protein isolate to a food processor and running the food processor to distribute the ingredients evenly, and adding ice to said food processor and running for about 15 seconds, or (ii) adding ice to said food processor and running for about one second, and adding said caseinate or calcium caseinate and whey protein isolate to said food processor and running the food processor to distribute the ingredients evenly, (b) optionally hand mixing said slurry and running in said food processor for about another 15 seconds, (c) transferring said slurry to a container and adding water to where said slurry contains about 75% to about 85% water, and (d) running said slurry in an evaporator for about 60 minutes to about 75 minutes at a temperature of about 65° C. to about 85° C. and about 120 rpm to about 140 rpm.

6. The dietary fiber composition according to claim 1, wherein said mixture contains about 10% to about 15% dietary fiber.

7. The dietary fiber composition according to claim 1, wherein said spray atomizing is at about 17,000 rpm to about 20,000 rpm and at about 210° C. to about 220° C.

8. A fiber enriched food product comprising at least one food ingredient and the dietary fiber composition according to claim 1.

9. The fiber enriched food product according to claim 8, wherein said fiber enriched food product contains about 1% to about 40% of said dietary fiber composition.

10. The fiber enriched food product according to claim 8, wherein said food ingredient is flour.

11. The fiber enriched food product according to claim 10 which is a bakery product, wherein said bakery product is selected from the group consisting of cake, biscuit, pie crust, cookie, muffin, bread, cereal, doughnut, noodle, brownie, cracker and snack food.

12. The fiber enriched food product according to claim 11, wherein said bakery product is a cookie or muffin.

13. A method of making a fiber enriched food product, comprising adding the dietary fiber composition according to claim 1 to one or more food ingredients or adding one or more food ingredients to the dietary fiber composition according to claim 1.

14. A method of increasing fiber in the diet of a mammal, comprising feeding to said mammal the fiber enriched food product according to claim 8.

15. The dietary fiber composition according to claim 1, wherein said cooking is at a temperature of about 65° C. to about 85° C.

16. The dietary fiber composition according to claim 1, wherein said process consists essentially of cooking a calcium caseinate or calcium caseinate and whey protein isolate slurry, wherein said slurry contains no more than 50% whey protein isolate, in all evaporator at a temperature of about 65° C. to about 85° C. to produce a slurry of cross-linked matrices of protein, adding dietary fiber to said slurry of cross-linked matrices of protein to form a mixture, and spray atomizing said mixture in a spray dryer to produce said dietary fiber composition.

* * * * *